(12) United States Patent
Wang et al.

(10) Patent No.: US 7,440,756 B1
(45) Date of Patent: Oct. 21, 2008

(54) CONTROLLING MICRO-ROAMING IN A WIRELESS LAN

(75) Inventors: Huizhao Wang, San Jose, CA (US); Xiaode Xu, Fremont, CA (US); Wenfeng Huang, San Ramon, CA (US); Kushal A. Patel, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 181 days.

(21) Appl. No.: 10/853,994

(22) Filed: May 21, 2004

(51) Int. Cl.
   *H04Q 7/20* (2006.01)
   *H04B 7/00* (2006.01)
(52) U.S. Cl. .................. 455/436; 455/525
(58) Field of Classification Search .......... 455/443, 455/432.1, 436, 525; 370/449, 338, 389, 370/466; 709/230
See application file for complete search history.

(56) References Cited

U.S. PATENT DOCUMENTS

| | | | | |
|---|---|---|---|---|
| 5,901,362 A | * | 5/1999 | Cheung et al. | 455/525 |
| 6,067,297 A | * | 5/2000 | Beach | 370/389 |
| 2001/0046223 A1 | * | 11/2001 | Malki et al. | 370/338 |
| 2004/0039831 A1 | * | 2/2004 | Grimminger | 709/230 |
| 2004/0203781 A1 | * | 10/2004 | Lefkowitz | 455/436 |
| 2004/0246933 A1 | * | 12/2004 | Valko et al. | 370/338 |
| 2005/0013316 A1 | * | 1/2005 | Liao et al. | 370/449 |

* cited by examiner

*Primary Examiner*—Joseph Feild
*Assistant Examiner*—Kiet Doan
(74) *Attorney, Agent, or Firm*—Weaver Austin Villeneuve & Sampson LLP

(57) ABSTRACT

The present invention detects a micro-roaming client in a WLAN. Once a micro-roaming client is detected, APs coordinate with each other and assign the client to a specific AP. In an embodiment, a user-configurable anchor timer for micro-roaming clients is provided, so that when the timer has expired, the client is free to roam within the overlapping cell until it becomes anchored to an AP again. In various embodiments, environmental variables can affect APs to release an anchored client to roam again. These environmental variables may include low RSSI from the client, a high percentage of frame loss to the client, or a low data rate. The present invention also provides a new protocol that is resilient and self-sustaining with minimal user configuration required.

11 Claims, 3 Drawing Sheets

CONTROLLING MICRO-ROAMING IN A WIRELESS LAN

FIELD OF THE INVENTION

The present invention relates broadly to management of clients within a wireless local area network. Specifically, the present invention relates to controlling micro-roaming clients in a wireless local area network.

BACKGROUND

Often in a deployment of a wireless local area network (WLAN) environment, the coverage of access point (AP) cells, from which client devices obtain service in the WLAN, overlap each other to achieve a maximum RF coverage area to reduce "holes" or non-service spots. However, this approach creates a severe problem referred to as "micro-roaming" or "ping pong" effect in overlapping cells. The micro-roaming or ping-pong effect is a phenomenon wherein a wireless client, such as a phone, laptop, or handheld computing device, inside an overlapping coverage area, is rapidly roaming among APs within the cell. When a client enters a micro-roaming state, often it cannot settle itself on a particular AP. This causes data frames to be dropped frequently, creates noticeable voice gaps or call drops for client telephones, and creates an excessive load burden among the APs as well as the backbone network infrastructure that handles the roaming events.

A prior approach to solving the problem of micro-roaming is to reduce each AP's transmit power, and possibly the client transmit power as well, in an effort to reduce the overlapping area within the cells. However, this approach is ineffective as it reduces the overall RF coverage area, and creates non-service spots that are too large to be acceptable.

BRIEF SUMMARY OF THE INVENTION

The present invention solves the problem described above without sacrificing RF coverage area, and without any client software modification requirement. By using a protocol among APs, the present invention is able to eliminate micro-roaming clients in overlapping cells.

In one aspect, the present invention provides a method for managing a micro-roaming client in a wireless local area network having a plurality of access points managed by a wireless local area network controller. The present invention detects a micro-roaming client by at least one access point that receives signals from the client and a plurality of disassociation messages from at least one other access point within the plurality; elects an access point from the plurality to serve as an anchor access point that serves requests made by the micro-roaming client; and while the elected access point is serving as the anchor access point, the remaining access points in the plurality refrain from serving any request made by the micro-roaming client. In an embodiment, detecting a micro-roaming client comprises receiving a plurality of disassociation messages within a predetermined time period. In an embodiment.

the disassociation messages are used to construct a list of adjacent access points. An access point notifies the remaining access points in the plurality of existence of the micro-roaming client. A notified access point determines whether the notifying access point is on its adjacent access point list and, if not, it adds the notifying access point to its adjacent access point list. Then, the notified access point adds the micro-roaming client to its micro-roaming client list. In an embodiment, once a micro-roaming client is detected, one of the adjacent access points is elected to serve as the anchor access point.

Electing an access point to serve as an anchor access point, in accordance with an embodiment of the present invention, comprises nominating an access point currently associated with the micro-roaming client to serve as anchor access point; if the nominated access point declines to serve as anchor point, then attempting to select an alternative anchor access point from the plurality; otherwise, if all of the plurality of adjacent access points decline to serve as anchor access point, then assigning the access point currently associated with the micro-roaming client to serve as access point. In an embodiment, in choosing to become the anchor, the anchor access point communicates to the other access points a duration of time during which the anchor access point serves as the anchor access point.

Many other features and advantages of the present invention will become apparent upon reading the following detailed description, when considered in conjunction with the accompanying drawings, in which:

DETAILED DESCRIPTION

The present invention detects a micro-roaming client in a WLAN. In a preferred embodiment, the present invention utilizes a WLAN of voice over Internet protocol (VOIP) phone deployment sites. Once a micro-roaming client is detected, APs coordinate with each other and assign the client to a specific AP. In an embodiment, a user-configurable anchor timer for micro-roaming clients is provided, so that when the timer has expired, the client is free to roam within the overlapping cell until it becomes anchored to an AP again. In various embodiments, environmental variables can affect APs to release an anchored client to roam again. These environmental variables may include low return signal strength indicator (RSSI) from the client, a high percentage of frame loss to the client, or a low data rate. The present invention also provides a new protocol that is resilient and self-sustaining with minimal user configuration required.

Figure 1:
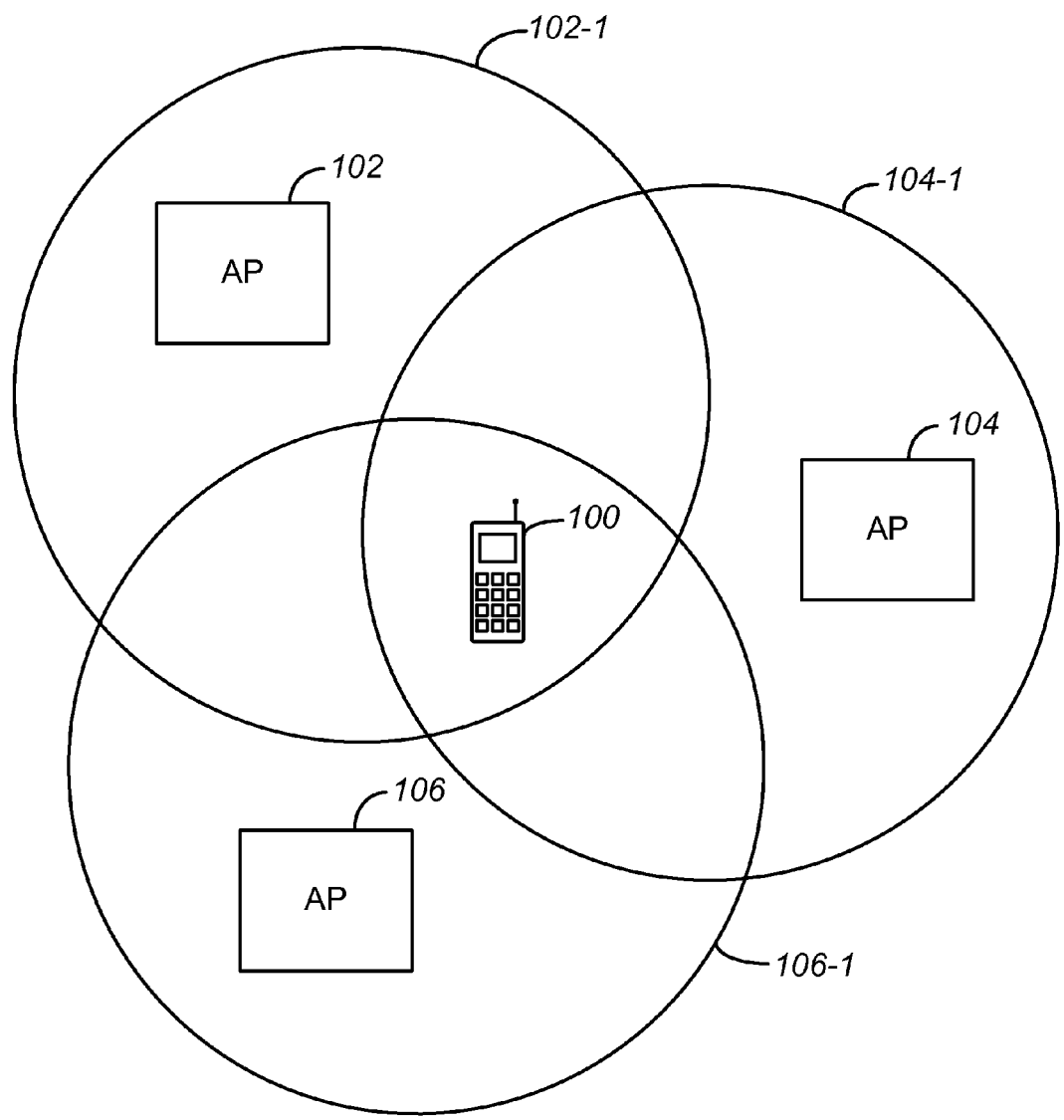
FIG. 1 illustrates a micro-roaming client in a WLAN having multiple APs that define a cell in accordance with the present invention.

The micro-roaming effect is depicted in FIG. 1. Client 100 is exposed to coverage from multiple APs 102, 104, 106, having coverage cells 102-1, 104-1, and 106-1, respectively. While three APs are illustrated in FIG. 1, it is to be understood that WLANS can be configured to have different numbers of APs with overlapping cells. Often, the software of client 100 does not have sophisticated roaming logic implemented. Client 100 engages in rapid roaming processes among the APs it can detect. Typically, a micro-roaming client switches its APs at a frequency of less than 5~10 seconds. Whenever client 100 roams to a new AP, the new AP informs other APs of the roaming event via broadcast disassociation notice frames. To detect a micro-roaming client within a cell, APs can monitor these disassociation notice frames, and record them over a period of time for a specific client. If multiple roaming events for a particular client are detected within this period of time, the client is determined to be a micro-roaming client.

Figure 2:
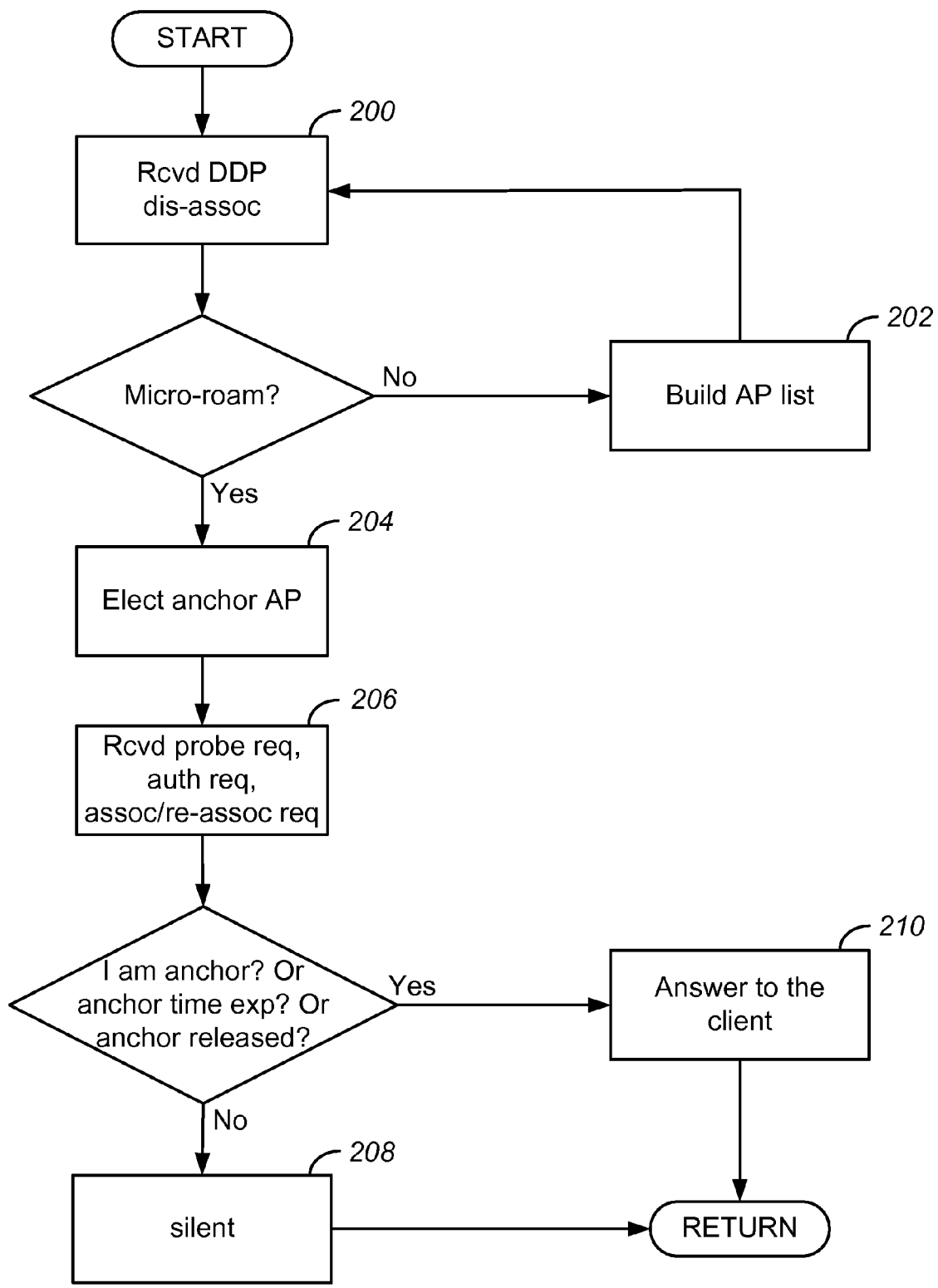
FIG. 2 illustrates a sequence of acts performed in accordance with embodiments of the present invention to manage micro-roaming clients within a WLAN.

When a micro-roaming client is detected, APs 102, 104, 106 elect from among themselves an anchor AP for client 100. In an embodiment, the AP closest to client 100 is elected to serve as the anchor AP. The anchor AP serves client 100 despite client 100 moving to a location that is closer to another AP than the anchor AP. In an embodiment, once the anchor AP is elected, it posts an anchor time period for client 100 and this anchor time is also propagated to the other APs. The anchor AP is responsible for handling client 100's probe requests, authentication requests and association/re-association requests. In the meanwhile, the other APs within the cell ignore requests from client 100 until either the anchor time expires for client 100 or the anchor AP releases client 100 and informs the other APs of the release. FIG. 2 depicts the process of micro-roaming prevention.

Directing attention to FIG. 2, the present invention provides logic, in the form of instructions that are executed by processors on the APs to implement a micro-roaming prevention protocol (MRPP) used among APs to coordinate anchor AP election process, propagate client anchor time period, and inform other APs of releasing an anchored client. The MRPP includes a micro-roaming detection phase, an anchor AP election phase, and a micro-roaming client anchor phase.

The micro-roaming detection phase utilizes a disassociation notification message transmitted by an AP that has accepted a new association from a particular client. In the preferred embodiment, this message is a broadcast message.

Initially, upon receipt of a disassociation message (reference numeral 200), APs use the disassociation message for a client to construct an adjacent AP list for the cell during adjacent AP discovery (reference numeral 202). If the disassociation message is for a client currently associated to the AP, the AP activates its micro-roaming detection timer for a period of time. In the preferred embodiment, the period lasts 30 seconds, but is adjustable by user configuration. If the AP has received more than two disassociation messages or the client is actually roaming back, the AP can then declare the client to be a micro-roaming client. Once an AP has detected a micro-roaming client, it transmits a new micro-roaming declare message to all the APs within the cell. APs that receive the micro-roaming message need to check the sending AP's MAC address to see if the sending AP is in its adjacent AP list. If the sending AP is in the list, the receiving AP will then add the client into its own micro-roaming list. If the sending AP is not in the list, but the client is associated with the sending AP, then the receiving AP adds the sending AP to it adjacent AP list and adds the client into its own micro-roaming list.

The anchor AP election phase will now be described. Once the client is added to the micro-roaming list, APs within the cell begin the process of electing an anchor AP for the client (reference numeral 204). In an embodiment, the AP that has the current association with the client has the first priority to serve as the anchor AP. This currently-associated AP may transmit an anchor select message with the code, "anchor AP" to declare that it is the anchor AP. In an embodiment, the message, "anchor AP" includes the field, "anchor time" having a time value expressed in seconds. APs within the cell record this anchor time value into their respective micro-roaming tables for the client. If the currently-associated AP chooses to decline to be the anchor AP, it transmits an anchor select message with the code, "anchor decline," so that other APs know that the currently-associated AP has declined to be the anchor AP. In an embodiment, the declining AP also transmits a 802.11 disassociation frame to the client to disassociate the client immediately. In an embodiment, if the currently-associated AP declines to serve as the anchor AP, the AP with the highest MAC address may assume the anchor AP role by transmitting an anchor select message with the code, "anchor AP." If the currently-associated AP chooses to decline serving as the anchor AP, it transmits a anchor select message with the code "anchor decline." Then, the next highest MAC address AP assumes the role of currently-associated AP. The process repeats until either one AP is declared as anchor AP, or all of the APs in the adjacent list decline the role. If all of the APs decline serving as anchor AP, then the AP that was associated with the client at the beginning of this process is forced to serve as anchor AP for the client.

The micro-roaming client anchor phase will now be described. Once the anchor AP election phase is completed, all APs that receive (reference numeral 206) any probe request, authentication request or (re)association request from the client, with the exception of the anchor AP, remain silent to these requests (reference numeral 208) and do not respond to them until the anchor timer expires or a new anchor AP release message is received. This way, only the anchor AP serves the micro-roaming client (reference numeral 210) and resources on the WLAN are conserved. When the anchor time expires for the client, each AP deletes the client from its micro-roaming list, and each AP is now free to respond to the client's roaming requests. The anchor AP may choose to release the client before the anchor time expires for reasons such as poor RSSI from the client, high rate of frame loss to the client, AP overload, low data transmission rate with the client, and other reasons. The AP can transmit a new anchor release message to inform the APs within the cell that the client is now free to roam. However, the AP still maintains the association with the client until the client roams away by itself.

Figure 3:
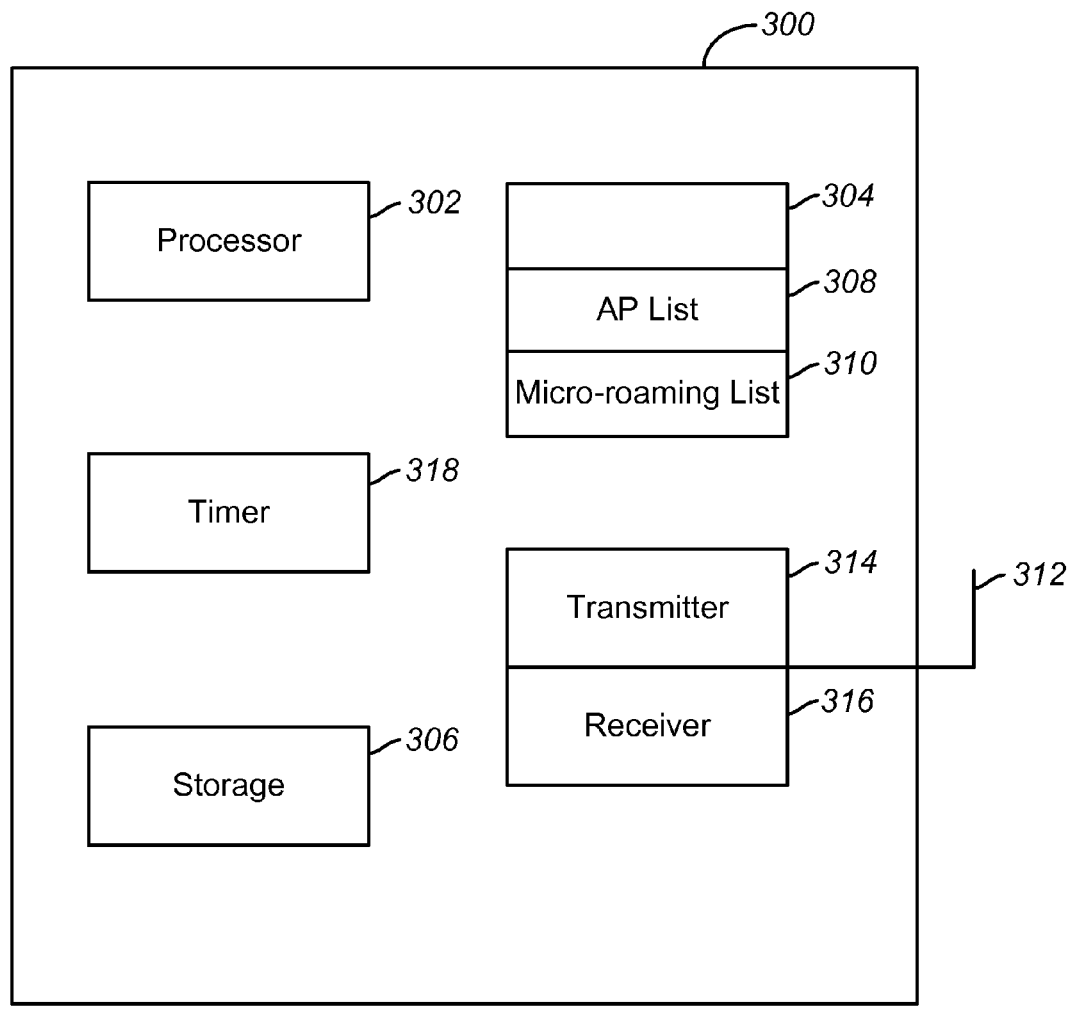
FIG. 3 illustrates in block diagram form the components of an access point in accordance with the present invention.

FIG. 3 illustrates in block diagram form the major, functional components of an AP in accordance with the present invention. AP 300 can be substituted for APs 102, 104, and 106 in FIG. 1. AP 300 includes processor 302, which executes instructions to perform the acts illustrated in FIG. 2. These instructions can be stored in memory 304, or alternatively in storage 306, and moved into memory 304 as needed. Alternatively, these instructions can be implemented as circuitry configured to perform the acts shown in FIG. 2, and incorporated in processor 302 or an additional processor (not shown). Memory 304 also contains adjacent AP list 308 and micro-roaming list 310 described above in the explanation of FIG. 2. Antenna 312 is connected to RF transmitter 314 and receiver 316 to communicate with client 100 and other APs. Micro-roaming timer 318 is implemented as a simple counter and operated as described above in the explanation of FIG. 2.

While a method, apparatus and computer program product for controlling, reducing and preventing the effects of micro-roaming in a WLAN have been described and illustrated in detail, it is to be understood that many variations and modifications can be made to embodiments of the present invention without departing from the spirit thereof.

The invention claimed is:

1. A method for managing a micro-roaming client in a wireless local area network having a plurality of access points managed by a wireless local area network controller, the method comprising:

detecting a micro-roaming client by at least one access point that receives signals from the client and a plurality of disassociation messages from at least one other access point within the plurality;

electing an access point from the plurality to serve as an anchor access point that serves requests made by the micro-roaming client;

while the elected access point is serving as the anchor access point, the remaining access points in the plurality refrain from serving any request made by the micro-roaming client;

wherein detecting a micro-roaming client comprises receiving a plurality of disassociation messages within a predetermined time period; and wherein the disassociation messages are used to construct a list of adjacent access points.

2. The method of claim 1, wherein detecting a micro-roaming client comprises: an access point notifies the remaining access points in the plurality of existence of the micro-roaming client.

3. The method of claim 2, wherein a notified access point determines whether the notifying access point is on its adjacent access point list and:

if the notifying access point is on its adjacent access point list, the notified access point adds the micro-roaming client to a micro-roaming client list; else the notified access point adds the notifying access point to its adjacent access point list and adds the micro-roaming client to its micro-roaming client list.

4. The method of claim 1, wherein the anchor access point serves as anchor access point until a period of time passes.

5. The method of claim 4, further comprising the anchor access point communicating to the other access points a duration of time during which the anchor access point will serve as anchor access point.

6. The method of claim 4, wherein electing an access point comprises:

nominating an access point currently associated with the micro-roaming client to serve as anchor access point;

if the nominated access point declines to serve as anchor point, then attempt to select an alternative anchor access point from the plurality;

if the plurality of access points declines to serve as anchor access point, then assigning the access point currently associated with the micro-roaming client to serve as access point.

7. The method of claim 1, wherein electing an access point to serve as an anchor access point comprises:

determining that an access point declines to serve as an anchor access point; and electing another access point to serve as an anchor access point.

8. A computer-readable medium containing instructions which, when executed by a computer, manages a micro-roaming client in a wireless local area network having a plurality of access points, by:

detecting a micro-roaming client;

electing an access point from the plurality to serve as an anchor access point that serves requests made by the micro-roaming client; and while the elected access point is serving as the anchor access point, the remaining access points in the plurality refrain from serving any request made by the micro-roaming client;

wherein electing an access point to serve as an anchor access point comprises:

determining that an access point declines to serve as an anchor access point; and electing another access point to serve as an anchor access point.

9. A access point device for use in a wireless local area network, the device configured to communicate with other devices to participate in electing an access point device from the plurality of devices to serve requests made by the micro-roaming client, wherein while the elected access point device is serving as the anchor access point device, the remaining access point devices in the plurality refrain from serving any request made by the micro-roaming client;

wherein electing an access point to serve as an anchor access point comprises:

determining that an access point declines to serve as an anchor access point; and electing another access point to serve as an anchor access point.

10. The access point device of claim 9, wherein the device comprises:

a processor, a receiver, a transmitter; and instructions, which, when executed by the processor, cause the device to manage a micro-roaming client in a wireless local area network having a plurality of access points managed by a wireless local area network controller, by:

detecting a micro-roaming client by at least one access point that receives signals from the client and a plurality of disassociation messages from at least one other access point within the plurality;

electing an access point from the plurality to serve as an anchor access point that serves requests made by the micro-roaming client;

while the elected access point is serving as the anchor access point, the remaining access points in the plurality refrain from serving any request made by the micro-roaming client.

11. A access point device for use in a wireless local area network, the device configured to communicate with other devices, the device comprising:

means for participating in electing an access point device from a plurality of devices to serve requests made by the micro-roaming client, wherein while the elected access point device is serving as the anchor access point device, the remaining access point devices in the plurality refrain from serving any request made by the micro-roaming client; and a timer means for identifying a period during which a client is determined to be a micro-roaming client;

wherein electing an access point to serve as an anchor access point comprises:

determining that an access point declines to serve as an anchor access point; and electing another access point to serve as an anchor access point.

* * * * *